United States Patent
Sosnowski et al.

[11] 3,839,067
[45] Oct. 1, 1974

[54] METHOD OF MAKING A THIN FILM WAVE GUIDE EMPLOYING STRESS INDUCED BIREFRINGENCE BY DESPOSITION IN A POLYMER FROM SOLUTION

[75] Inventors: Thomas Patrick Sosnowski, Colts Neck; Heinz Paul Weber, Middletown, both of N.J.

[73] Assignee: Bell Telephone Laboratories, Incorporated, Murray Hill, N.J.

[22] Filed: Sept. 25, 1972

[21] Appl. No.: 291,770

[52] U.S. Cl. ............... 117/33.3, 117/62, 117/124 E, 117/161 UB, 117/161 UH, 117/161 UF, 350/96 WG
[51] Int. Cl. ...... G02b 5/14, B44d 1/44, B32b 17/10
[58] Field of Search .. 350/96 WG; 117/33.3, 124 E, 117/161 UB, 161 UH, 161 UF, 62

[56] References Cited
UNITED STATES PATENTS

| | | | |
|---|---|---|---|
| 3,318,651 | 5/1967 | Karbowiak | 350/96 WG |
| 3,537,020 | 10/1970 | Anderson | 350/96 WG |
| 3,556,635 | 1/1971 | Schrenk et al. | 350/96 WG |
| 3,582,398 | 6/1971 | Ringler | 117/161 UB |

OTHER PUBLICATIONS
Ulrich et al., "Solution Deposited Films as Passive and Active Light Guides" in Applied Optics, Vol. 11, pp. 428–434, February 1972.
Chemical Abstracts, Vol. 70: 4760r, 1969.
Kovacs et al., "Optical Detection of Thermal Transitions in High Polymers" in J. of Applied Polymer Science Vol. 16, No. 2, pp. 301–313, February 1972.

*Primary Examiner*—Ralph Husack
*Assistant Examiner*—William H. Schmidt
*Attorney, Agent, or Firm*—Wilford L. Wisner

[57] ABSTRACT

A method for the fabrication of low loss birefringent polymer thin films on transparent substrates and their use for optical polarization wave converters are disclosed. The films consist of transparent acrylic or styrene polymers and copolymers and are deposited from liquid solution by evaporation of the solvent to provide substantial amounts of internal stress which induces the birefringence. The films are attractive because the birefringence and mean refractive index thereof are readily adjustable by annealing at a temperature below the softening point of the polymer and because they can be conveniently deposited on any of a large number and kind of substrate materials. The birefringence may also be adjusted by varying the solvent in the liquid solution. Furthermore, by properly selecting film thicknesses, the birefringence enables TE and TM polarization waves to propagate in the films degenerately. Such films may serve to simplify the construction and improve the operation of polarization wave converters, switches, modulators, filters and other thin-film devices requiring degenerate mode operation.

3 Claims, 4 Drawing Figures

METHOD OF MAKING A THIN FILM WAVE GUIDE EMPLOYING STRESS INDUCED BIREFRINGENCE BY DESPOSITION IN A POLYMER FROM SOLUTION

BACKGROUND OF THE INVENTION

This invention relates to thin-film optical waveguide devices and, more particularly, to low loss birefringent polymer thin films for use with such devices.

A number of methods and materials have recently been reported for the fabrication of low loss dielectric films to be used with thin film waveguide devices in the field of integrated optics. Notwithstanding the number and variety of such reports, most low loss optical film materials presently known and used are amorphous and therefore optically isotropic. In arrangements in which such isotropic films are deposited on substrates that are also isotropic, collinearly propagating waves in the film with different polarization directions (i.e., TE and TM waves) have respectively different propagation constants (i.e., different wave velocities). The differences in propagation constants can be especially large in films which support only a single transverse order mode. These differences present problems in many device applications.

For example, in many thin-film devices, it is required that the wave energy in the films be efficiently coupled or converted from one polarization to another. Such devices include thin-film polarization wave converters, switches, modulators and filters. Since, at least, one of the substrate or cover materials in such devices are optically anisotropic, there is some coupling between orthogonally polarized waves. However, the differences in propagation constants between different polarization waves prevents complete coupling by limiting the length of film over which the waves can interact.

To maximize the efficiency of the coupling operations in the devices, the differently polarized waves must be made to propagate degenerately, that is, with equal propagation constants over substantial distances in the film. S. Wang and his associates, in Volume 19 of Applied Physics Letters, page 187 (1971), allegedly achieve such degeneracy in a thin-film wave converter by using an isotropic guiding thin film disposed on an appropriately oriented anisotropic (i.e., birefringent) substrate, or by using an isotropic guiding thin film sandwiched between an appropriately oriented anisotropic (i.e., birefringent) cover layer and an isotropic substrate. The proper operation of such devices has been found to be very critically dependent on the selected film thicknesses, which determine degeneracy. Alternatively, a low loss guiding thin film which is itself birefringent can be used to achieve the same degeneracy. In the latter case, the degeneracy can advantageously be made rather uncritically dependent on the various device parameters, including film thicknesses. Since film materials cannot be expected to have precisely the correct amount of birefringence for degeneracy for any given pair of waves propagating therein, it is thus desirable to find practical methods and materials for the fabrication of birefringent guiding thin films in which the birefringence is readily adjustable. The methods presently known for fabricating such films are, for the most part, complex, and limited to few materials.

SUMMARY OF THE INVENTION

We have found that low loss birefringent thin films can be fabricated by a relatively simple method involving the deposition of certain transparent polymer materials on transparent substrates. The films, which consist of transparent acrylic or styrene polymers or copolymers, are deposited from liquid solutions by evaporation of the solvent to provide substantial amounts of internal stress, which, in turn, induces the birefringence. An initial birefringence of about $5 \times 10^{-3}$ has been experimentally measured in an exemplary film of polystyrene. Most of the films have an optical loss as low as that of the best films prepared by any of the film fabrication methods recently reported.

An important aspect of our discovery is the fact that the amount of birefringence and the mean index of refraction of the films can be readily controlled with our method and materials. The initial amount of birefringence of the films can be controlled by properly selecting the solvents that are used during the solution-deposition. Annealing, that is, heating at slightly elevated temperatures after the films are deposited, causes progressive and controllable decreases in the birefringence of the films from its initial value. Similarly, by using various derivatives and/or various copolymers with the starting polymer in solution, the mean refractive index of the resultant films can be adjusted over wide ranges.

Another aspect of our discovery is the fact that, by properly selecting film thicknesses during the deposition, the birefringence in the films enables TE and TM polarization waves to propagate therein degenerately. Degeneracies over distances in the films of up to 3 centimeters have been achieved in our early experiments. The films may thus serve to simplify the construction and improve the operation of polarization wave converters, switches, modulators, filters and other thin-film optical devices requiring degenerate mode operation.

Still another aspect of our discovery is the fact that birefringent films can conveniently be deposited on any of a large number and kind of transparent substrate materials. The only requirements are that the substrate have at least one substantially smooth surface and, for guiding purposes, that the substrate material have an index of refraction lower than that of the films. Consequently, isotropic, as well as anisotropic, electro-optic, and other type materials can be employed as substrates; the amount of birefringence in each case is substantially the same.

BRIEF DESCRIPTION OF THE DRAWINGS

These and other aspects of our discovery will be best understood from the following detailed description taken in conjunction with the accompanying drawings in which.

DETAILED DESCRIPTION

Figure 1:
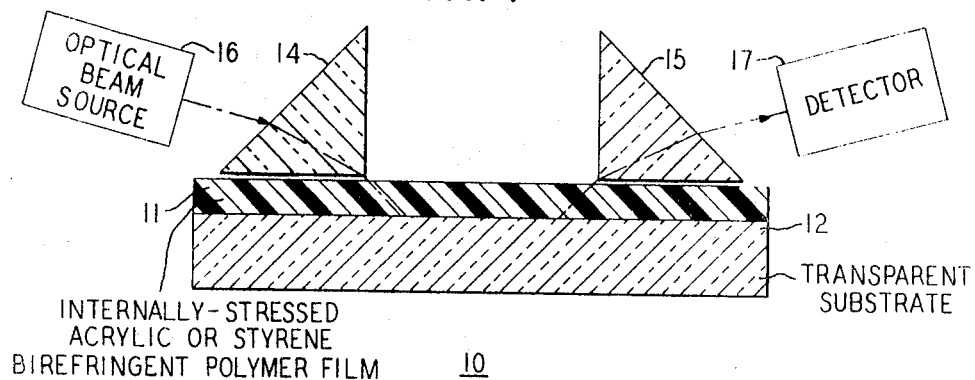
FIG. 1 is a partially pictorial, partially schematic illustration of an optical waveguide device employing a birefringent polymer film according to our invention.

Device 10 of FIG. 1 is illustratively an optical waveguide device for use as a transmission link in an optical communication system. It includes thin birefringent film 11 according to our invention, which is composed of an internally stressed transparent acrylic or styrene polymer or copolymer material and deposited from liquid solution on transparent substrate 12. The term "transparent," as used herein, will be understood to mean substantially pervious to radiation of the type being employed. Substrate 12, which is illustratively a simple glass microscope slide, has, for most applications, an index of refraction that is lower in magnitude than that of film 11. Film 11 has a thickness typically of the order of magnitude of the wavelength of radiation to be propagated therein, so that the radiation is effectively confined in that dimension by the dielectric discontinuities provided by the major surfaces of the film, i.e., the substrate/film and air-space/film interfaces. The amount of birefringence of film 11 is selected according to our invention so that differently polarized waves propagate in the film with the desired relative propagation constants and velocities. For purposes of our invention, the thickness of the film may be anywhere within the range of 0.1 – 50 times the wavelength, but is preferably between one and 10 times the wavelength. Propagation of the radiation in the two broad dimensions of film 11 is typically unrestricted.

Coupling means 14 and 15 are provided for introducing and extracting radiation to be propagated in the film. The radiation from source 16 is typically coherent with the wavelength in the optical range of the electromagnetic spectrum (which includes visible as well as infrared and ultraviolet wavelengths). Source 16 may be any suitable source, e.g., a laser. Detector 17 is illustratively positioned to receive the extracted radiation. Also, means, not shown, can be provided for polarizing and analyzing the incoming and outcoming waves.

The particular coupling prisms 14 and 15, as depicted in FIG. 1, are described in detail in Volume 14 of Applied Physics Letters, page 291 (1969). Other means are available for performing the same function. Optical coupling and decoupling can be accomplished, for example, by means of optical gratings appropriately formed on one of the major surfaces of either film 11 or substrate 12. Such grating couplers are described in detail in U.S. Pat. No. 3,674,335, issued July 4, 1972.

Figure 2:
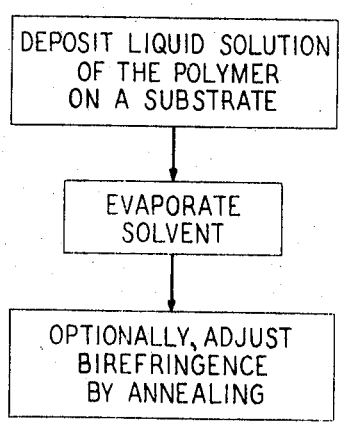
FIG. 2 is a block diagrammatic representation of the basic steps involved in fabricating birefringent polymer films according to our invention.

The block diagrammatic illustration of FIG. 2 sets forth the basic sequence of steps involved in fabricating birefringent polymer films such as film 11 of FIG. 1. The two basic steps of depositing a liquid solution of polymer on a substrate and evaporating the solvent have been previously used in the preparation of light-guiding films of certain materials by J. H. Harris et al in Volume 60 of Journal of the Optic Society of America, page 1007 (1970), and R. Ulrich and H. P. Weber in Volume 11 of Applied Optics, page 428 (1972). We have found that when certain other materials are employed with this technique, i.e., acrylic or styrene polymer or copolymer materials, the films are deposited with substantial amounts of birefringence, which we tentatively believe results, at least in part, from internal stress.

As should be understood by those skilled in the art, acrylic polymers include the various polymers of acrylic acid and its derivatives, as well as polymers of the acrylate families. The styrene polymers include polymers of styrene and its derivatives with substitution on the ethylenic double bond or on the benzene ring. Copolymers of these materials constitute polymers of at least one acrylic monomer and at least one styrene monomer in the same chain.

Table I lists seven specific examples of the solution-deposited acrylic or styrene polymer and copolymer films of our invention, along with the solvents used with each, the measured birefringence $\Delta n$ and the measured means index $n$. The table is in no way meant to be inclusive of all materials useful for our invention, the listing thereof being merely illustrative. The various terms in Table I, particularly the numbers in Column 3 thereof, will be explained more fully in the description to follow.

TABLE I

| Example | Polymer | Solvent | Fringes No./cm | $\Delta n$ | $n$ |
|---|---|---|---|---|---|
| 1 | poly(methylmethacrylate) | xylene | 6 | $0.37 \times 10^{-3}$ | 1.49 |
| 2 | poly(benzylmethacrylate) | benzene | 40 | $2.5 \times 10^{-3}$ | 1.56 |
| 3 | poly(2-naphthylmethacrylate) | benzene | 2.5 | $0.15 \times 10^{-3}$ | 1.64 |
| 4 | styrene-acrylic acid copolymer | vinyl alcohol | 33 | $2.1 \times 10^{-3}$ | 1.54 |
| 5 | poly(styrene) | xylene | 37 | $2.3 \times 10^{-3}$ | 1.59 |
| 6 | poly(styrene) | benzene | 76 | $4.7 \times 10^{-3}$ | 1.59 |
| 7 | poly(bromostyrene) | benzene | 160 | $10.0 \times 10^{-3}$ | 1.62 |

Examples of the films of the materials of Table I were prepared in our early experiments on pyrex or glass microscope slides as substrates with an area of about 25×75 millimeters, and with an index of refraction of about 1.470 for pyrex and 1.512 for glass at a wavelength $\lambda = 0.633$ microns. The slides were cleaned to remove any dust or other foreign matter that might affect the film quality during deposition. Cleaning was illustratively accomplished by washing the slides with a detergent, followed by thorough rinsing with tap water and then cold distilled water. While still wet, the slides were blown dry with pure nitrogen.

The film-forming solution of polymer and solvent was then deposited on the slides. As described in the above-cited article of R. Ulrich and H. P. Weber, the solution can be simply poured on the slides using a syringe until the slide surface is flooded. Tilting the slides into a vertical position allows the excess solution to drip off the slides. The final film thickness is adjusted by properly selecting initial liquid film thickness and the initial concentration of polymer in solution. A detailed discussion of the technique for determining the final film thickness is contained in the just-mentioned article.

To provide highly effective control over the thicknesses of the film, other techniques of depositing the liquid solution on the substrate are available. A well-known spin coating method, developed largely for use in the deposition of photoresist films, can be used to provide highly uniform films of small and exact thicknesses. The particular coating or depositing method employed would depend, at least in part, upon the precision desired in the final device. A trade-off is typically made between precision and ease of fabrication.

Once the film-forming liquid solution was deposited on the substrate, the solvent in the solution was evaporated. Evaporation was illustratively carried out at or near room temperature and was air-aided. It should proceed slowly, however, particularly during the initial stages of drying. During this period, the solution is still sufficiently liquid so that it can flow under the influence of its own surface tension, which action tends to level all small-scale irregularities in the surface profile. Slow evaporation thus serves to improve the uniformity, smoothness, and overall optical quality of the resultant films.

The birefringence and other optical properties of the acrylic and styrene polymer films produced according to the above-described solution-deposition technique were evaluated for numerous examples. To illustrate the various measurements, we concentrate in the discussion to follow on films of polystyrene as an exemplary material deposited from a solution in which xylene was the solvent. Although the particular numbers given in each case are for polystyrene, it should be understood that the various measuring arrangements discussed are equally applicable to all films of acrylic or styrene polymer or copolymer materials produced according to our invention.

A glass prism coupler, such as coupler 14 of FIG. 1, was used to launch light at $\lambda = 0.633$ micron into the various modes of several different solution-deposited polystyrene films. In films with thicknesses which supported only a single transverse order mode (i.e., the zeroth or fundamental mode), the measured loss was found to be of the order of 0.1 dB per centimeter. This loss value compares favorably with the best values reported for any conventional or new thin film fabrication methods or materials.

The bulk indices of refraction for TE (electric vector in the plane of the film) and TM (electric vector approximately orthogonal to the plane of the film) polarization waves, $n_{TE}$ and $n_{TM}$, respectively, were evaluated by the now well-known technique of measuring synchronous angles in multiple transverse order mode films. As shown in the article by P. K. Tien et al. in Volume 14 of Applied Physics Letters, page 291 (1969), it is possible to excite the various transverse order modes by varying the angle of incidence of the light beam on the prism coupler. Angles of the beam for proper excitation of the various modes are called the synchronous angles. Accurate knowledge of the synchronous angles enables an independent determination of the bulk refractive indices of the films. Values for the polystyrene films were $n_{TE} = 1.5862 \pm 0.0005$ and $n_{TM} = 1.5886 \pm 0.0005$. The mean index was thus 1.5874±0.0005, while the evaluated birefringence, $\Delta n$, was $2.4 \pm 1.0 \times 10^{-3}$.

Because the values obtained by the synchronous angle measurements are slightly dependent upon the pressure applied by the prism coupler to the polymer films, we used another method which allows a more accurate determination of the birefringence. Using converging light beams polarized intermediate between the TE and TM orientation, we coupled the light into the films simultaneously in both TE and TM polarization waves of the fundamental transverse order along a common propagation axis. By viewing the films at an angle of about 45° to the film plane, one can see the interference pattern of the light scattered out of the films from the two polarization waves. The pattern appears as a series of discrete bright spots, or fringes, regularly spaced along the propagation axis. From the fringe separation, the absolute value of the birefringence can be evaluated. The fringe separation, which is denoted $l_c$, is determined by the equation:

$$l_c = \lambda/2(N_{TE}^{(o)} - N_{TM}^{(o)}), \tag{1}$$

where $\lambda$ is the free space wavelength of the guided wave and $N_{TE}^{(o)}$ and $N_{TM}^{(o)}$ are the effective film refractive indices for the fundamental transverse order modes of the TE and TM polarization waves, respectively.

For films that support several transverse order modes, the relation $\Delta n \approx \Delta N = | N_{TE}^{(o)} - N_{TM}^{(o)} |$ holds and $\Delta n$ can be readily determined from the fringe separation. Using a device, such a a Soleil-Babinet compensator, to vary the relative phase of the TE and TM waves made incident on the prism coupler, the fringe pattern can be made to move along the propagation axis in the film. The sign of the birefringence can be evaluated by noting the propagation direction of the pattern as the relative phase is varied.

For the fundamental modes in a multimode polystyrene film of about 2.5 microns in thickness, 37 fringes per centimeter were observed. This number, which is given in Column 3 of Table I for each material listed, corresponds to a fringe separation $l_c$ of about 0.027 centimeter (No. fringes/cm = $1/l_c$) and, from Equation 1, a birefringence $\Delta N = 2.34 \times 10^{-3}$.

The amount of birefringence for each of the acrylic and styrene polymer films produced by solution-deposition was found to be independent of the kind of substrate material employed in each case. Various other types of glass could be substituted for the glass microscope slide substrates with negligible change in the measured birefringence. Films could also be formed on other birefringent (i.e., anisotropic) materials such as ammonium dihydrogen phosphate (ADP) and potassium dihydrogen phosphate (KDP). In each case, the film birefringence was the same as when they were deposited on the glass microscope slides.

The particular cleaning process used before film deposition did not affect the amount of measured birefringence. Additionally, the molecular weight of the polymer and the initial concentration of polymer in solution had no observable effect on the birefringence. Films of polystyrene, for example, having selected molecular weights ranging from 20,400 to 670,000 showed little difference in birefringence in our experiments. Furthermore, single transverse order mode films up to films supporting as many as 25 transverse order modes appeared to have the same birefringence.

The amount of birefringence was found to depend on the solvent used with the polymer in each case. When benzene instead of xylene is used as a solvent with polystyrene, for example, a larger birefringence of about $4.7 \times 10^{-3}$ was measured. It is believed that the increase in birefringence is due to the faster deposition that takes place with the more volatile solvent, benzene, which, in turn, induces greater internal stress in the films. It would appear, therefore, that choosing solvents with higher volatilities in each case should provide films with increased values of birefringence.

We also found that the initial amount of birefringence can advantageously be decreased controllably in each case by annealing after deposition. Heating the polystyrene films, for example, at temperatures greater than about 50° centigrade (C) for periods of about 30 minutes caused progressive decreases in birefringence. For temperatures less than about 50°C, the films remained unchanged. After heating at temperatures of about 120°C for several hours, the polystyrene films could be made essentially isotropic. The softening point of polystyrene is about 80°C. It appears, therefore, that annealing at temperatures somewhat below the softening point for each material allows the most effective control in the birefringence change. It should thus be appreciated that various combinations of initial birefringence, annealing times and temperatures can be employed to produce films with the correct amount of birefringence for any application. The correct combinations are best determined experimentally for each material under consideration.

One additional desirable feature of the birefringent polymer films produced by solution-deposition is the fact that the mean refractive indices thereof are readily adjustable. By choosing the various acrylic or styrene derivatives or copolymers in combination with the primary polymer in solution, the index of the films can be selected from wide ranges. The exact composition of various polymers is again best determined experimentally in each case in view of the data available in the art relating to the various refractive indices of the materials. This feature of the films facilitates selection of suitable higher index birefringent film materials for specific substrate or cover materials in various thin film device applications, particularly in those in which very small, precisely controlled differences in the index are required.

From the evaluated birefringence and the mean value of the bulk index of refraction $n$ obtained from the synchronous angle measurements, a plot of the effective indices $N_{TE}$ and $N_{TM}$ versus film thickness $W$ can be computed for each of the films. Such a plot is shown in FIG. 3 for the illustrative film of polystyrene on a glass microscope slide substrate.

Figure 3:
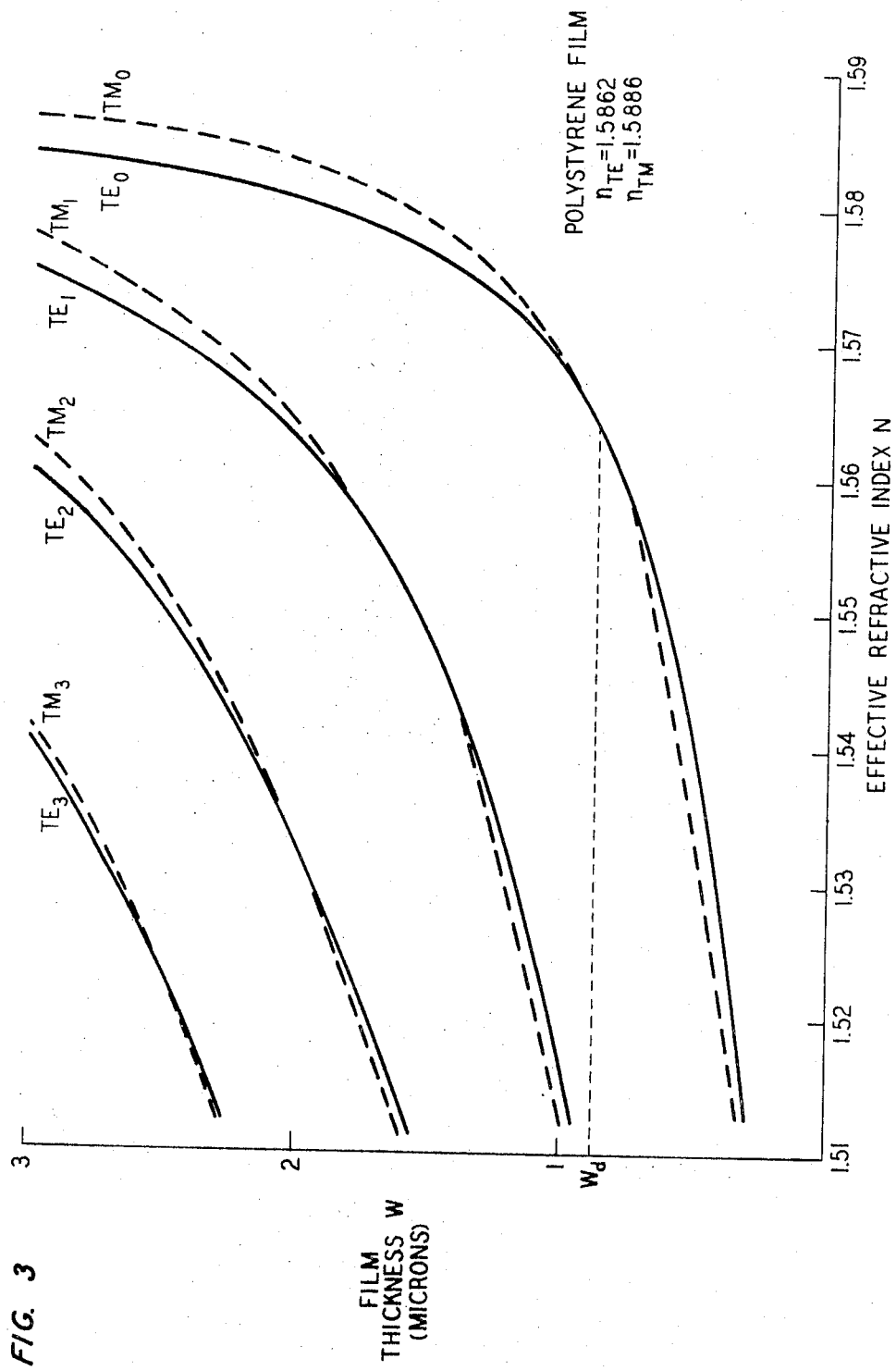
FIG. 3 is a plot of effective indices versus film thickness for an illustrative birefringent film of polystyrene.

In FIG. 3 the dashed curves correspond to values for TM waves, while the solid curves correspond to values for TE waves. The subscript on the various "TE" and "TM" designations in the drawing represent the order of the transverse mode in each case. Thus, "$TM_0$" represents the zeroth or fundamental transverse order mode of the TM wave, whereas "$TE_2$" represents the second transverse order mode of the TE wave.

It may be seen from FIG. 3 that, for a film thickness $W = W_d$, the effective index $N_{TE}$ is equal to the effective index $N_{TM}$ for the fundamental modes. It is also noted that for $W < W_d$, $N_{TM}$ is less than $N_{TE}$; whereas for $W > W_d$, $N_{TM}$ is greater than $N_{TE}$. From Equation 1 above, the fringe separation $l_c$ theoretically should approach infinity for films of thickness $W_d$. Such a case corresponds to complete degeneracy in the propagation of the two polarization waves in the fundamental modes. Although such a case is achievable theoretically, degeneracy is practically achievable only over finite distances in the film because of the precise control required of film uniformity. In our experiments, we have been successful in achieving degeneracy over distances of up to 3 centimeters in our birefringent films simply by selecting initial film thicknesses and by controlling the uniformity of the films during deposition. Degeneracies over such distances would be adequate for most thin-film waveguide devices requiring degenerate mode operation.

Figure 4:
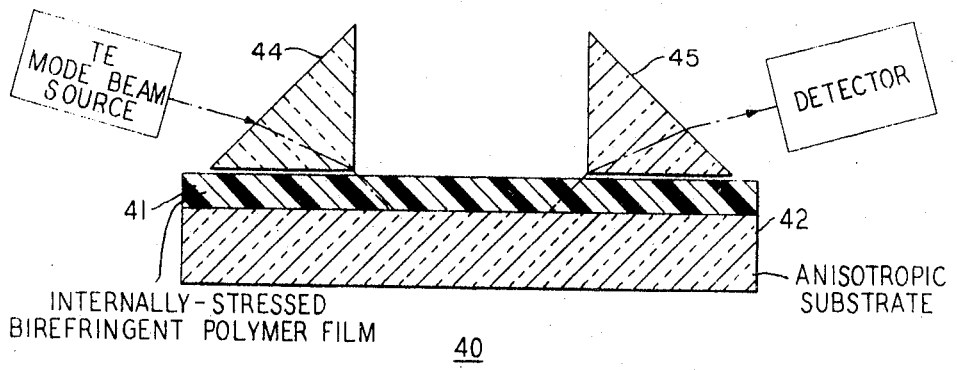
FIG. 4 is a partially pictorial, partially schematic illustration of a polarization wave converter employing a birefringent polymer film according to our invention.

As a specific example of the use of the birefringent films produced according to our invention, consider device 40 of FIG. 4. Device 40 is a thin-film polarization wave converter which is analogous in function to a half-wave plate of bulk optical frequency systems. It serves to convert incident optical waves from one polarization to another passively, that is, without the use of external means such as an applied electric or magnetic field. As described, device 40 illustratively converts incident TE waves from optical beam source 46 to TM waves which are detected by detector 47.

Device 40 includes internally stressed birefringent polymer thin-film 41 according to our invention, which is deposited on transparent substrate 42. Prisms 44 and 45 are used for coupling the beam into and out of film 41. Substrate 42 is composed of an optically anisotropic material such as ADP. It thus has an optic axis and different bulk indices of refraction for waves polarized parallel to and orthogonal to the optic axis (i.e., extraordinary and ordinary waves, respectively). In the device shown, the optic axis of the substrate material is illustratively oriented parallel to the plane of film 41 at an angle $\alpha$, measured with respect to the propagation axis of the beam in the film, not equal to 0° or 90°.

Since substrate 42 is anisotropic, there is coupling and consequently also some polarization wave conversion in device 40 between TE and TM waves in the film. Complete TE $\rightleftharpoons$ TM conversion, however, is possible only for complete degeneracy in the propagation of the TE and TM waves in film 41. By using birefringent film materials, nearly 100 percent conversion efficiency can be readily achieved in device 40. Advantageously, the high efficiencies achievable with the birefringent films are also rather uncritically dependent on variations in the various experimental parameters involved (e.g., film thicknesses).

To analyze the operation of device 40, we use a particular theory of traveling waves in two coupled waveguides as presented by S. E. Miller in Volume 33 of the Bell System Technical Journal, page 677 (1954). We can directly adopt his theoretical results if we identify his two separate waveguides with the two guided polarization waves in film 41. We choose a coordinate system in which the $z$ axis is parallel to the propagation direction of the coupled beam in film 41 (i.e., the film plane), and the $x$ axis is orthogonal to the film plane with $x = 0$ at the film-substrate interface. With the assumption that at $z = 0$, all the wave energy in the film is in the TE wave, we find the electric field of the TM wave with a power nnormalized amplitude at a distance $z$ along the propagation direction from the following relationship $$E_{TM}(z) = E_{TE}(o) \cdot [1+(k\Delta N/2)^2]^{-1/2} \cdot \sin\{z[1+(k\Delta N/2)^2]^{1/2}\} \quad (2)$$

which is Equation 32 from the above-cited Miller reference. Here, $\Delta N = N_{TE} - N_{TM}$ and is the difference in the effective refraction indices of the guided TE and TM waves, is the coupling strength and $k = 2\pi/\lambda$. The effective indices $N_{TE}$ and $N_{TM}$ depend upon the bulk indices of the film and substrate materials, the film thickness, and the orientation of the optic axis of the crystal substrate. One notes that $dE_{TM}/dz|_{z=0} = \cdot E_{TE}(o)$.

An inspection of Equation 2 shows that the amplitude $E_{TM}(z)$ oscillates with $z$. As is evident from Equation 2 and as indicated previously, complete polarization wave conversion in film 41 is possible only for $\Delta N = 0$. The distance $d$ in the film over which the films are coupled is given by $$d = \pi/(2) \quad (3)$$

Nearly complete conversion is achieved for small deviations of $\Delta N$ from zero.

With these principles in mind, we look for experimental arrangements in which $\Delta N$ is adjustable and simultaneously uncritically dependent on the film thickness W (i.e., where $d\Delta N/dW \to 0$ with $\Delta N = 0$).

Such a situation is illustratively achieved in device 40 with the following experimental parameters. As noted above, we select for the anisotropic substrate an orientation with the optic axis in the film plane. By varying the angle $\alpha$ between the optic axis and the propagation axis of the beam in the film, it is possible to vary the extraordinary substrate index and thus $\Delta N$. The substrate material is illustratively an ADP crystal with an ordinary index $n_0 = 1.5224$ and an extraordinary index $n_E = 1.4776$ at 0.633 microns. For film 41 we illustratively use polystyrene deposited from a solution with xylene. Film thickness is 2 microns. By annealing, the birefringence of the film is adjusted to $2\times10^{-4}$.

We couple light into film 41 with prism film coupler 44 into both TE and TM modes simultaneously. Looking at the film at an angle of 45° to the film plane, one observes the spatial beating of the light scattered out of the film as mentioned previously. From this we measure directly the fringe separation and obtain the value of $\Delta N$. By retarding the beam of one polarization with respect to the other with a Soleil-Babinet compensator placed in front of the coupling prism, we evaluate the sign of $\Delta N$ from the direction from which the fringes move in the film. Degeneracy occurs in the film for the angle $\alpha$ at which the spatial beating pattern changes its direction of propagation relative to the film. At the calculated conversion length $d$ in the film for Equation 3 above, we couple the light out of the film with a second prism film coupler 45. In this particular embodiment, the conversion efficiency of an incident TE wave to TM wave was experimentally found to be 96 percent. Temperature variations of several °C in either direction are found to have a negligible effect on the measured efficiency. Variations in film thickness W in the embodiment of about ±25 percent also have negligible effects on efficiency.

Device 40 is only illustrative of the many uses to which the birefringent polymer films of our invention can be put. The operation of most thin film waveguide devices requiring degenerate mode operation can be improved and the construction be simplified by the use of birefringent films. Such devices generally include polarization wave converters, switches, modulators and filters, many variations of which have been reported in the literature of the field. The fact that the birefringent films of our invention can be fabricated by a relatively simple and economical method and that the birefringence and mean refractive index thereof can be readily adjusted makes the films attractive candidates for many device applications.

It should also be understood that the particular steps in the method, materials, conditions and parameters set forth hereinabove are only illustrative, and that the scope of the invention is not limited thereto. Various modifications of the basic principles of the invention will be recognized by those skilled in the art.

We claim:

1. A method of fabricating an optical thin film waveguide capable of degenerate mode propagation, said method comprising the steps of depositing a thin film of a liquid solution of a transparent polymer and a solvent on a transparent substrate having at least one substantially smooth surface and an index of refraction which is less than that of said polymer, said transparent polymer being selected from the group consisting essentially of acrylic polymers, styrene polymers and styrene-acrylic copolymers, solidifying said film by evaporating said solvent from said liquid solution to provide in said film an initial amount of stress-induced birefringence, coupling an optical wave into said solidified film to propagate in at least one TE polarization mode and at least one TM polarization mode simultaneously along a common propagation axis therein, examining the interference fringe pattern of the optical wave energy scattered out of said film from the respective modes of said waves along said common propagation axis, and adjusting the birefringence of said film by annealing at a temperature below the softening point of said polymer until the spacing $l_r$ between consecutive fringes in said interference pattern is maximized.

2. The method of claim 1 in which the initial birefringence of said film is varied by varying the solvent in said liquid solution of said depositing step.

3. The method of claim 1 in which said depositing step comprises depositing a thin film of a liquid solution consisting essentially of a transparent polymer and a solvent selected from poly(methylmethacrylate) and xylene, poly(benzylmethacrylate) and benzene, poly(2-naphthyl-methacrylate) and benzene, styrene-acrylic acid copolymer and vinyl alcohol, poly(styrene) and xylene, poly(styrene) and benzene, or poly(bromostyrene) and benzene.

* * * * *

UNITED STATES PATENT AND TRADEMARK OFFICE
CERTIFICATE OF CORRECTION

PATENT NO. : 3,839,067
DATED : October 1, 1974
INVENTOR(S) : Thomas P. Sosnowski and Heinz P. Weber It is certified that error appears in the above-identified patent and that said Letters Patent are hereby corrected as shown below:

Column 6, line 33, "such a a" should read --such as a--.
Column 9, Equation 2 should read $$E_{TM}(z) = E_{TE}(o) \cdot [1+k(\Delta N/2\kappa)^2]^{-1/2} \cdot \sin\{\kappa z[1+(k\Delta N/2\kappa)^2]^{1/2}\} \quad (2)$$

Column 9, line 11, "waves, k is the coupling", should read --waves, κ is the difference--.
Column 9, line 15 should read $$dE_{TM}/dz\big|_{z=0} = \kappa \cdot E_{TE}(o).$$

Column 9, Equation 3 should read $$d = \pi/(2\kappa) \quad (3)$$

Signed and Sealed this eleventh Day of November 1975

[SEAL]

Attest:

RUTH C. MASON
Attesting Officer

C. MARSHALL DANN
Commissioner of Patents and Trademarks